United States Patent
Saito et al.

(10) Patent No.: US 8,849,204 B2
(45) Date of Patent: Sep. 30, 2014

(54) SHORT-RANGE WIRELESS COMMUNICATION APPARATUS

(75) Inventors: Soichi Saito, Nagoya (JP); Suguru Matsushita, Obu (JP); Takahisa Ozaki, Gamagori (JP); Ryuji Sakata, Kariya (JP); Shinichi Yamamoto, Toyota (JP); Kazushige Hayashi, Toyota (JP); Masao Sasaki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 13/640,534

(22) PCT Filed: May 16, 2011

(86) PCT No.: PCT/JP2011/002692
§ 371 (c)(1),
(2), (4) Date: Oct. 11, 2012

(87) PCT Pub. No.: WO2011/145314
PCT Pub. Date: Nov. 24, 2011

(65) Prior Publication Data
US 2013/0029604 A1  Jan. 31, 2013

(30) Foreign Application Priority Data

May 17, 2010 (JP) .................................. 2010-113196
Sep. 20, 2010 (JP) .................................. 2010-210304

(51) Int. Cl.
*H04B 7/00* (2006.01)
*H04W 76/02* (2009.01)
*H04W 84/10* (2009.01)
*H04W 76/06* (2009.01)
*H04W 84/18* (2009.01)
*H04M 1/60* (2006.01)

(52) U.S. Cl.
CPC ............ *H04W 76/028* (2013.01); *H04W 84/10* (2013.01); *H04W 76/06* (2013.01); *H04W 76/02* (2013.01); *H04M 2250/02* (2013.01); *H04W 84/18* (2013.01); *H04M 1/6075* (2013.01)
USPC .......... 455/41.2; 455/41.1; 455/418; 455/68; 455/69; 455/569.1; 455/569.2; 709/227; 709/228

(58) Field of Classification Search
USPC ........ 455/418, 420, 41.1, 41.2, 67.11, 68, 69, 455/569.1, 569.2, 3.01, 3.05, 3.06; 709/227, 228, 230, 231, 232, 237
See application file for complete search history.

(56) References Cited

U.S. PATENT DOCUMENTS 7,050,834 B2 * 5/2006 Harwood et al. ............. 455/563
7,162,276 B2 * 1/2007 Iwase ......................... 455/569.1
(Continued)

FOREIGN PATENT DOCUMENTS

JP  2007-150766 A   6/2007
JP  2007-281652 A   10/2007

OTHER PUBLICATIONS

International Search Report of the International Searching Authority mailed Aug. 9, 2011 for the corresponding international application No. PCT/JP2011/002692 (with English translation).
(Continued)

*Primary Examiner* — Tuan A Tran
(74) *Attorney, Agent, or Firm* — Posz Law Group, PLC

(57) ABSTRACT

A subject short-range wireless communication apparatus capable of simultaneously connecting multiple profiles with another short-range wireless communication apparatus acting as a connection counterpart is disclosed. The subject apparatus comprises: a communication disconnection detection device that, in cases where a first profile is connected between the subject apparatus and the another apparatus, detects whether or not the first profile is disconnected due to the subject apparatus' non-acceptance of a connection request of a second profile sent from the another apparatus; and a communication re-connection device that, in response to disconnection of the first profile detected by the communication disconnection detection device, re-connects the first profile with the another apparatus.

7 Claims, 5 Drawing Sheets

(56) References Cited

U.S. PATENT DOCUMENTS

| | | | |
|---|---|---|---|
| 7,973,657 B2 * | 7/2011 | Ayed | 340/539.23 |
| 8,082,011 B2 * | 12/2011 | Nagasawa | 455/569.1 |
| 8,116,223 B2 * | 2/2012 | Tian et al. | 370/252 |
| 8,150,474 B2 * | 4/2012 | Saito et al. | 455/569.2 |
| 8,265,557 B2 * | 9/2012 | Chung | 455/41.2 |
| 8,295,766 B2 * | 10/2012 | Zimbric et al. | 455/41.2 |
| 8,725,217 B2 * | 5/2014 | Kitahara | 455/569.2 |
| 2004/0106378 A1 | 6/2004 | Kim et al. | |
| 2007/0129116 A1 * | 6/2007 | Katoh et al. | 455/569.1 |
| 2007/0135175 A1 | 6/2007 | Matsuda | |
| 2008/0051156 A1 | 2/2008 | Matsuda | |
| 2008/0269961 A1 * | 10/2008 | Shitanaka et al. | 701/2 |
| 2008/0299908 A1 * | 12/2008 | Tanada | 455/41.3 |
| 2009/0124281 A1 * | 5/2009 | Takamune et al. | 455/550.1 |
| 2009/0253466 A1 * | 10/2009 | Saito et al. | 455/569.2 |
| 2009/0253467 A1 * | 10/2009 | Saito | 455/569.2 |
| 2010/0069007 A1 | 3/2010 | Nagasawa | |
| 2010/0070637 A1 * | 3/2010 | Saito et al. | 709/228 |
| 2010/0112988 A1 | 5/2010 | Tamura | |
| 2010/0210317 A1 | 8/2010 | Kakehi | |
| 2011/0081859 A1 * | 4/2011 | Chung | 455/41.2 |
| 2011/0237191 A1 | 9/2011 | Saito et al. | |

OTHER PUBLICATIONS

Written Opinion of the International Searching Authority mailed Aug. 9, 2011 for the corresponding international application No. PCT/JP2011/002692 (with English translation).

* cited by examiner

SHORT-RANGE WIRELESS COMMUNICATION APPARATUS

CROSS REFERENCE TO RELATED APPLICATIONS

This application is a U.S. national stage application of PCT/JP2011/002692 filed on May 16, 2011, and claims priority to, and incorporates by reference, Japanese Patent Applications No. 2010-113196 filed on May 17, 2010 and No. 2010-210304 filed on Sep. 20, 2010.

TECHNICAL FIELD

The present invention relates to a short-range wireless communication apparatus that can simultaneously connect multiple profiles with another short-range wireless communication apparatus acting as a connection counterpart.

BACKGROUND ART

A Bluetooth communication apparatus having a Bluetooth®, abbreviated as "BT" hereinafter) communication function is known as a short-range wireless communication apparatus. For example, as described in Patent Documents 1 to 3, there is a BT communication apparatus that can simultaneously connect multiple profiles (capable of multi-profile connection) specified by the BT communication standard with another BT communication apparatus acting as a connection counterpart. The profile means a communication protocol defined on a function basis.

PRIOR ART DOCUMENT

Patent Document

Patent Document 1: JP-2007-281652A
Patent Document 2: JP-2007-158670A (corresponding to US 20070129116A)
Patent Document 3: JP-2008-53805A (corresponding to US 20080051156A)

SUMMARY OF INVENTION

Concerning a short-range wireless communication apparatus, the inventors of the present application have found out the following.

Among BT communication apparatuses capable of the multi-profile connection, there is a BT communication apparatuses that, after connecting Hands-Free Profile (HFP) or the like with a BT communication apparatus acting as the connection counterpart, seeks to further connect Advanced Audio Distribution Profile (A2DP). Hereinafter, the BT communication apparatus configured to further connect A2DP or the like is referred to as a first BT communication apparatus, and additionally, a BT communication apparatus connected with the first BT communication apparatus is referred to as a second BT communication apparatus.

While having HFP connection with the second BT communication apparatus acting as the connection counterpart, the first BT communication apparatus sends a connection request of A2DP, and if the second BT communication apparatus does not accept the connection request of A2DP, the first BT communication apparatus disconnects the already-connected HFP. Hereinafter, thin kind of disconnection of a profile (HFP) is referred to as "problematic operation."

The "problematic operation" will be explained in detail. When the second BT communication apparatus connects HFP with the first BT communication apparatus involving the problematic operation, the first BT communication apparatus involving the problematic operation sends a A2DP connection request to the second BT communication apparatus. When the second BT communication apparatus cannot accept the A2DP connection request due to its specification or due to resource shortage, the first BT communication apparatus involving the problematic operation disconnects, regardless of user's intention, the already-connected HFP, which was connected prior to the sending of the A2DP connection request. Thereafter, a HFP-disconnected state is maintained.

The present invention is made in view of the foregoing. It is an object of the present invention to provide a short-range wireless communication apparatus that can prevent a profile disconnection regardless of user's intention and prevent a disconnected state from being maintained.

According to a first aspect of the present invention, a subject short-range wireless communication apparatus, which is capable of simultaneously connecting a plurality of predetermined profiles with another short-range wireless communication apparatus acting as a connection counterpart, includes a communication disconnection detection device and a communication re-connection device. In cases where a first predetermined profile is connected between the subject short-range wireless communication apparatus and the another short-range wireless communication apparatus, the communication disconnection detection device detects whether or not the first predetermined profile is disconnected due to the subject short-range wireless communication apparatus' non-acceptance of a connection request of a second predetermined profile sent from the another short-range wireless communication apparatus. In response to disconnection of the first predetermined profile detected by the communication disconnection detection device, the communication re-connection device re-connects the first predetermined profile with the another short-range wireless communication apparatus when the communication disconnection detection device detects that the first predetermined profile is disconnected.

According to the above-described configuration of the subject short-range wireless communication apparatus, in cases where the first predetermined profile is connected between the subject short-range wireless communication apparatus and the another short-range wireless communication apparatus, the communication disconnection detection device detects whether or not the first predetermined profile is disconnected due to the subject short-range wireless communication apparatus' non-acceptance of the connection request of the second predetermined profile sent from the another short-range wireless communication apparatus (that is, the communication disconnection detection device detects whether or not the first predetermined profile is disconnected regardless of user's intention). Thereafter, the communication re-connection device re-connects the first predetermined profile, based on the detection of the disconnection of the first predetermined profile by the communication disconnection detection device. Accordingly, even if the connected profile is disconnected regardless of user's intention, it is possible to prevent the disconnected state from being maintained.

According to a second aspect of the prevent invention, a subject short-range wireless communication apparatus, which is capable of simultaneously connecting a plurality of predetermined profiles including a first predetermined profile and a second predetermined profile with another short-range wireless communication apparatus acting as a connection counterpart, includes a connection request suspension device and a connection request acceptance device. The connection request suspension device suspends accepting the connection request of the second predetermined profile sent from the another short-range wireless communication apparatus. When the subject short-range wireless communication apparatus rejects accepting the connection request of the second predetermined profile, the another short-range wireless communication apparatus disconnects the first predetermined profile connected between the subject short-range wireless communication apparatus and the another short-range wireless communication apparatus. While the connection request suspension device 101 is suspending accepting the connection request of the second predetermined profile, the connection request acceptance device secures a resource required to connect the second predetermined profile. After securing the resource required to connect the second predetermined profile, the connection request acceptance device accepts the connection request of the second predetermined profile.

According to the above-described configuration of the subject short-range wireless communication apparatus, upon receipt of the connection request of the second predetermined profile from the another short-range wireless communication apparatus, the subject short-range wireless communication apparatus does not reject the connection request of the second predetermined profile but temporarily suspends accepting the connection request of the second predetermined profile. Therefore, during the suspension, the another short-range wireless communication apparatus does not disconnect the first predetermined profile connected with the subject short-range wireless communication apparatus. Then, while the subject short-range wireless communication apparatus is suspending accepting the connection request of the second predetermined profile, in other words, while the first predetermined profile is connected, the subject short-range wireless communication apparatus secures the resource required to connect the second predetermined profile and accepts the connection request of the second predetermined profile after securing the resource. Therefore, it is possible to connect the second predetermined profile without disconnecting the first predetermined profile. In this way, it becomes possible to prevent the connected profile from being disconnected regardless user's intention. According to the above-described configuration, the disconnection of the connected profile regardless of user's intention does not occur, and the maintaining of the disconnected state can be avoided.

BRIEF DESCRIPTION OF DRAWINGS

The above and other objects, features and advantages of the present disclosure will become more apparent from the following detailed description made with reference to the accompanying drawings. In the drawings.

MODES FOR CARRYING OUT THE INVENTION

First Embodiment

A short-range wireless communication apparatus according to the first embodiment will be described with reference to FIGS. 1 and 2. In the present embodiment, an in-vehicle apparatus 100 supporting a Bluetooth (a registered trademark) (abbreviated to BT hereinafter) and having a BT communication function is embodied as a short-range wireless communication apparatus. It is assumed that a BT-supporting mobile phone 200 having a BT communication function is carried into a compartment of a vehicle (not shown) equipped with the in-vehicle apparatus 100, and that the in-vehicle apparatus 100 and the mobile-phone 200 are communicable with each other by BT communications. The BT-supporting mobile-phone 200 corresponds to "another short-range wireless communication apparatus."

Figure 1:
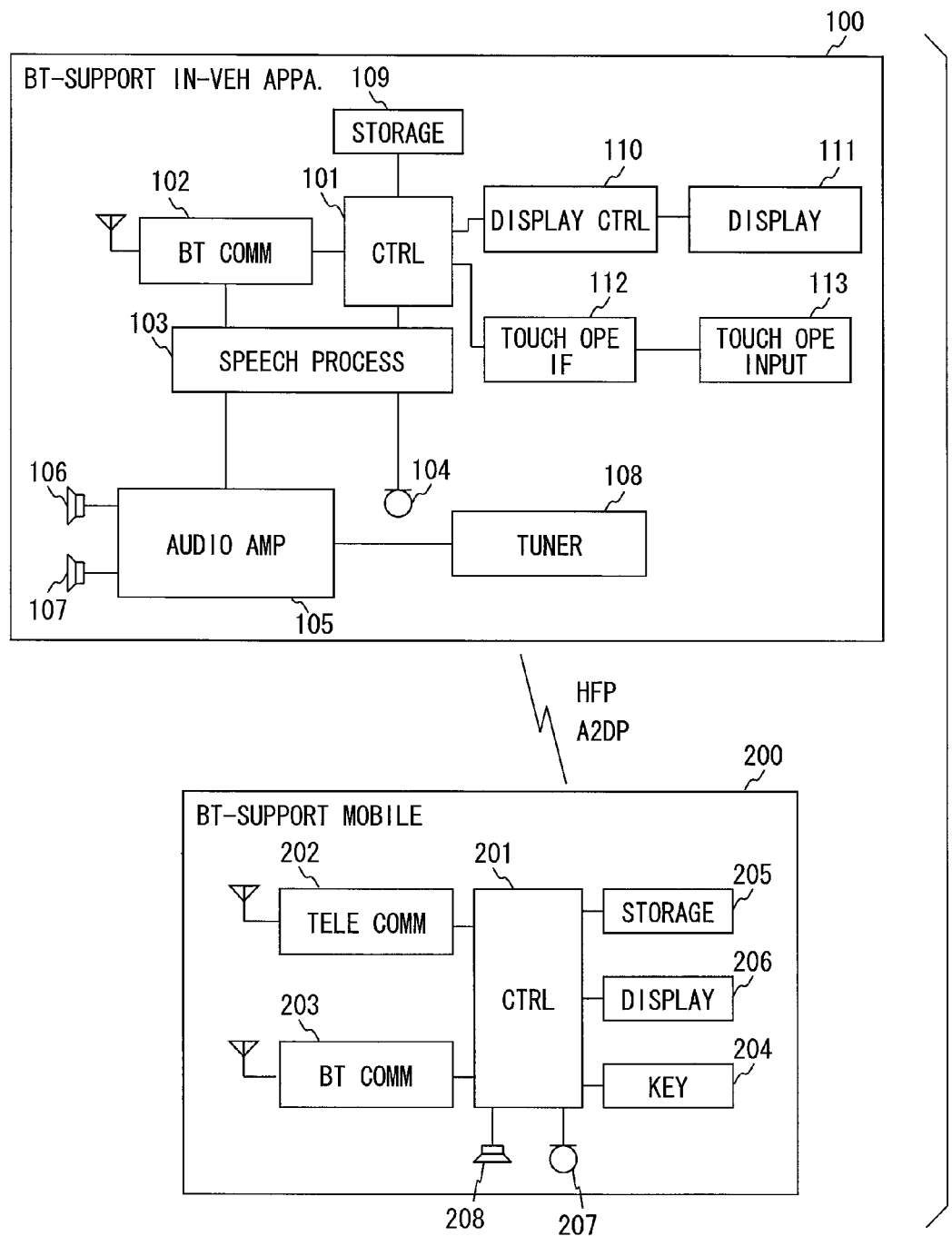
FIG. 1 is a block diagram illustrating an in-vehicle apparatus and a mobile-phone as short-range wireless communication apparatuses according to a first embodiment.

As illustrated in FIG. 1, the in-vehicle apparatus 100 includes a controller 101, a BT communication unit 102, a speech processing unit 103, a microphone 104, an audio amplifier 105, speakers 106 and 107, a tuner deck 108, a storage unit 109, a display control unit 110, a display 111, a touch operation input unit 112, and a touch operation input device 113.

The controller 101 may include a known microcomputer with a central processing unit (CPU), a random access memory (RAM), a read-only memory (ROM), an input/output (I/O) bus, and others. The controller 101 controls generally all of operations of the in-vehicle apparatus 100 such as a communication operation, a data management operation and the like.

The BT communication unit 102 is connected to the controller 101, and performs BT communication with the mobile-phone 200 under the control of the controller 101. The BT communication unit 102 is capable of performing concurrent connection of multiple profiles (so-called multi-profile connection) specified by the BT telecommunication standard, such as a hands free profile (HFP) for hands-free communication, an advanced audio distribution profile (A2DP) for packet transfer of music streaming data, and others. The HFP and A2DP mean the communication protocols defined on a function basis. The HFP may correspond to "a first predetermined profile of predetermined profiles" and the A2DP may correspond to "a second predetermined profile of the predetermined profiles."

The speech processing unit 103 is connected to the microphone 104 and the audio amplifier 105. The microphone 104 may be a known microphone. The microphone 104 is in the compartment and arranged at a place that facilitates collection of the user's voice, e.g., a place near a steering wheel. The audio amplifier 105 is connected to two speakers 106 and 107, which may be known speakers.

The speech processing unit 103 is connected to the controller 101 and the BT communication unit 102. Let us assume that the HFP is connected between the BT communication unit 102 and the mobile-phone 200. In this case, when the user's voice is inputted via the microphone 104 as an outgoing voice data, the speech processing unit 103 performs speech processing on the inputted outgoing voice data, and outputs the result to the BT communication unit 102. When an incoming voice data is inputted from the BT communication unit 102 to the speech processing unit 103, the speech processing unit 103 outputs the incoming voice data to the audio amplifier 105.

The speech processing unit 103 has a function to store streaming data and a function to reproduce the streaming data. When the speech processing unit 103 receives a streaming data from the mobile-phone 200 in a state where the A2DP is connected between the BT communication unit 102 and the mobile-phone 200, the speech processing unit 103 stores the received streaming data, reproduces the stored streaming data, and outputs the reproduced data to the audio amplifier 105.

The audio amplifier 105 is connected to the speech processing unit 103. When the incoming voice data or the music streaming data are inputted from the speech processing unit 103, the audio amplifier 105 amplifies the incoming voice data or the music streaming data and outputs it from the speakers 106 and 107. The audio amplifier 105 is connected also to the tuner deck 108. When a music reproduced from a music storage medium, a radio program received from a radio station, or the like are inputted from the tuner deck 108, the audio amplifier 105 amplifies the music or the radio program, and outputs it from the speakers 106 and 107.

The storage unit 109 can store various kinds of data. For example, the storage unit 109 stores a phone book data indicating a correspondence between telephone number and registered name; a outgoing call history data indicating a correspondence between outgoing call time and destination telephone number concerning an outgoing call made from the in-vehicle apparatus 100 or an outgoing call made from the mobile-phone 200 having the HFP connection with the in-vehicle apparatus 100; and an incoming call history data indicating a correspondence between incoming call time and caller's telephone number concerning an incoming call received by the mobile-phone 200 having the HFP connection with the in-vehicle apparatus 100. The storage unit 109 is connected to the controller 101, which can suitably read out various kinds of data from the storage 109 and write the d various kinds of data in the storage unit 109.

The display control unit 110 is connected to the controller 101 and the display 111. The display 11 displays various images on a screen. When receiving a display command signal from the controller 101, the display control unit 110 controls display operation of the display 111 based on the inputted display command signal.

The touch operation input unit 112 is connected to the controller 101 and the touch operation input device 113. The touch operation input device 113 forms a touch switch on the screen. When a operation detection signal is inputted from the touch operation input device 113 in response to the user's operation on the touch switch formed on the screen, the touch operation input unit 112 outputs the inputted operation detection signal to the controller 101, and the controller 101 analyzes the operation detection signal inputted from the touch operation input unit 112.

As illustrated in FIG. 1, the mobile-phone 200 includes a controller 201, a telephone communication unit 202, a BT communication unit 203, a key input unit 204, a storage unit 205, a display unit 206, a microphone 207, and a speaker 208.

The controller 201 may include a known microcomputer with a CPU, a RAM, a ROM, an I/O bus, and others, and controls generally all of operations of the mobile-phone 200.

The telephone communication unit 202 is connected to the controller 201, and performs telephone communication via a communication network (not shown) under the control of the controller 201. The communication network includes a facility for providing a known mobile-phone communication service, such as a mobile-phone base station and a base station controller.

The BT communication unit 203 is connected to the controller 201, and performs BT communication with the in-vehicle apparatus 100 under the control of the controller 201. As is the case with the BT communication unit 102, the BT communication unit 203 is capable of performing concurrent connection of multiple profiles (so-called multi-profile connection) specified by the BT communication standard, such as HFP and A2DP.

The key input unit 204 is connected to the controller 201, and includes various keys arranged for user operation. When the user operates various keys, the key input unit 204 outputs a signal corresponding to an operated key to the controller 201.

The storage unit 205 can store various kinds of data. For example, the storage unit 205 stores a phone book data indicating a correspondence between the telephone number and the registered name, and a streaming data received from the communication network by the telephone communication unit 202, and the like. The storage unit 205 is connected to the controller 201, which suitably writes various kinds of data in the storage unit 205 and reads out various kinds of data from the storage unit 205.

The display unit 206 is connected to the controller 201. When a display command signal is inputted from the controller 201, the display unit 206 displays various images based on the inputted display command signal.

The microphone 207 may include a known microphone and is connected to the controller 201. The speaker 208 may include a known speaker and is connected to the controller 201. When the A2DP is connected between the BT communication unit 203 and the in-vehicle apparatus 100, the controller 201 sends a streaming data stored in the storage unit 205 to the in-vehicle apparatus 100.

A certain type of mobile-phone 200 is configured to seek to further connect A2DP when having a HFP connection with the in-vehicle apparatus 100 acting as a connection counterpart (in other words, the certain type of mobile-phone 200 seeks to connect all the available profiles when there are profiles available to connect with the in-vehicle apparatus 100 acting as a connection counterpart). Additionally, there is a type of mobile phone 200 that, when having the HFP connection with the in-vehicle apparatus 100, sends a connection request of A2DP and disconnects the already-connected HFP if the connection request of A2DP is not accepted by the in-vehicle apparatus 100. This operation of disconnecting HFP has been already described as "problematic operation" in the section for a problem to be solved.

In the present embodiment, the in-vehicle apparatus 100 is configured to connect a requesting profile, which is a profile that in-vehicle apparatus 100 requests another short-range wireless communication apparatus to connect. Additionally, the in-vehicle apparatus 100 is configured to reject accepting a connection request of a requested profile, which is a profile that the in-vehicle apparatus 100 is requested to connect by the another short-range wireless communication apparatus. Specifically, when the in-vehicle apparatus 100 sends a connection request of a profile to the mobile-phone 200, the in-vehicle apparatus 100 connects the profile with the mobile-phone 200 upon receipt of a connection response of the profile from the mobile-phone 200. However, when the in-vehicle apparatus 100 receives a connection request of a profile from the mobile-phone 200, the in-vehicle apparatus 100 rejects the received connection request of the profile, sends a rejection response of the profile, and does not connect the profile with the mobile-phone 200.

When this in-vehicle apparatus 100 of the present embodiment seeks to connect HFP with the mobile-phone 200 performing the problematic operation, there arises the following situation, which will be described with reference to FIG. 2.

Figure 2:
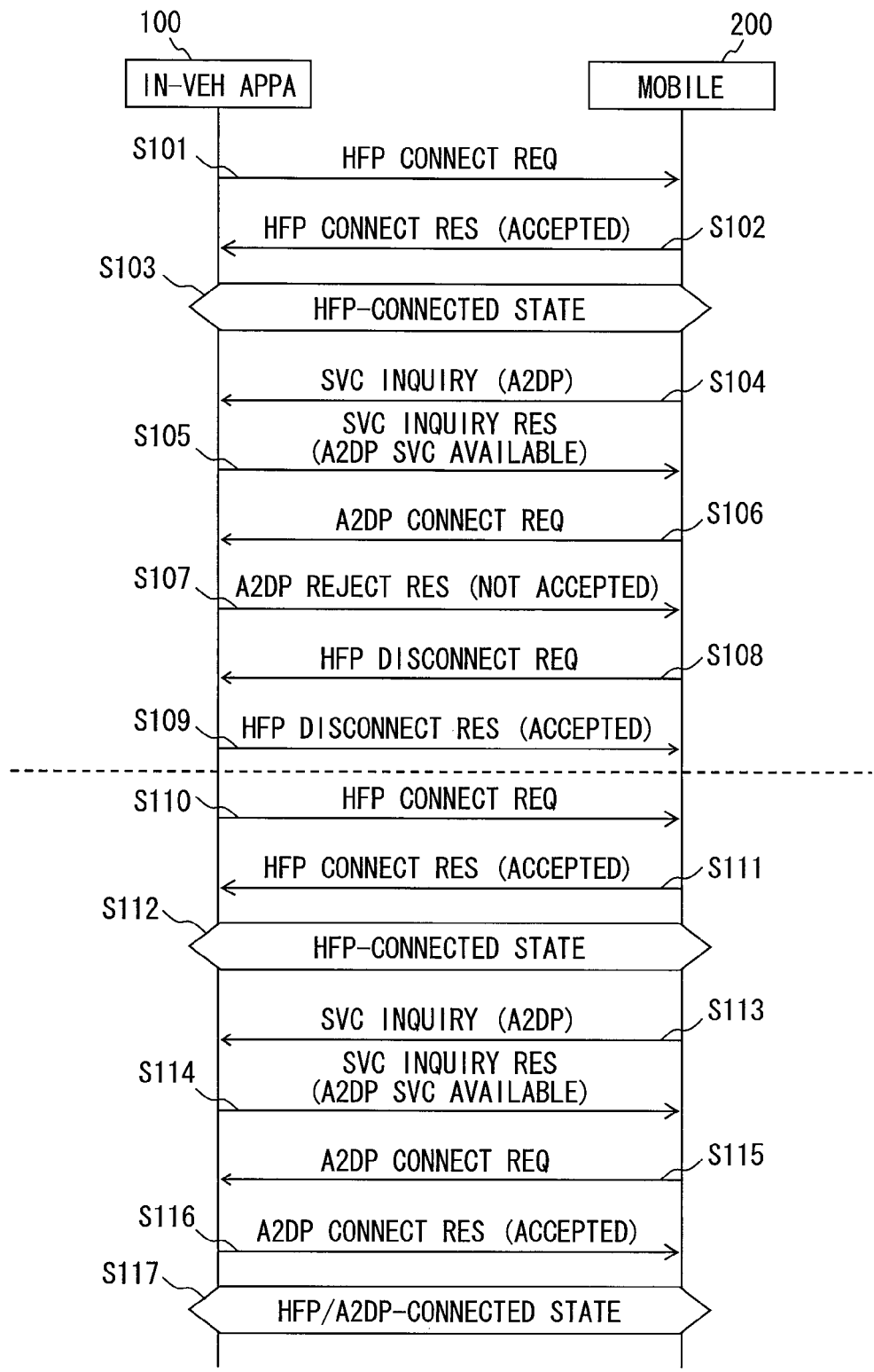
FIG. 2 is a sequence diagram illustrating an example of operations of the in-vehicle apparatus and the mobile-phone according to the first embodiment.

As illustrated in FIG. 2, the in-vehicle apparatus 100 first sends a connection request of HFP to the mobile-phone 200 at step S101. Upon receipt of the connection request of HFP, the mobile-phone 200 accepts the connection request of HFP and sends a connection response (Accepted) of HFP to the in-vehicle apparatus 100 at step S102. Upon receipt of the connection response of HFP, the in-vehicle apparatus 100 connects HFP with the mobile-phone 200 and becomes a HFP-connected state at step S103.

At this moment, the mobile-phone 200 having the HPF connection with the in-vehicle apparatus 100 seeks to further connect A2DP. Hence, at step S104, the mobile-phone 200 sends, to the in-vehicle apparatus 100, a service inquiry to check whether or not the service of A2DP is supported. Since the in-vehicle apparatus 100 supports the service of A2DP, upon receipt of the service inquiry from the mobile-phone 200, the in-vehicle apparatus 100 sends, to the mobile-phone 200, a service inquiry response indicating that the service of A2DP is available, at step S105. Then, upon receipt of the service inquiry response indicating that the service of A2DP is available from the in-vehicle apparatus 100, the mobile-phone 200 sends a connection request of A2DP to the in-vehicle apparatus 100 at step S106.

In this case, since the in-vehicle apparatus 100 has the above-described configuration, the in-vehicle apparatus 100 rejects accepting the connection request of A2DP sent from the mobile-phone 200, and sends a rejection response (Not accepted) of A2DP to the mobile-phone 200 at step S107. Then, since the mobile-phone 200 receives the rejection response of A2DP from the in-vehicle apparatus 100 (that is, the connection request of A2DP was not accepted), the mobile-phone 200 sends a disconnection request of HFP to the in-vehicle apparatus 100 at step S108 (the problematic operation).

As a result, at step S109, the in-vehicle apparatus 100 sends a disconnection response (Accepted) of HFP to the mobile-phone 200, and the mobile-phone 200 disconnects the already-connected HFP regardless of user's intention, and maintains a HFP-disconnected state. It should be noted that in the related art, S109 and steps before S109, which are steps above the dashed line of FIG. 2, are performed.

In view of this, in the present embodiment, when HFP is connected between the in-vehicle apparatus 100 and the mobile-phone 200, the in-vehicle apparatus 100 (specifically, the controller 101) detects whether or not the HFP is disconnected regardless of user's intention due to non-acceptance of the connection request of A2DP sent from the mobile phone. When the in-vehicle apparatus 100 detects the disconnection, the in-vehicle apparatus 100 re-connects HFP with the mobile-phone 200.

More specifically, the controller 101 starts measuring a time elapsed from a reference time point, which is a time point when the in-vehicle apparatus 100 rejects accepting the connection request of A2DP sent from the mobile-phone 200, that is, a time point when the in-vehicle apparatus 100 sends the rejection response (Not accepted) of A2DP to the mobile-phone 200 at step S107. When the HFP connection with the mobile-phone 200 is disconnected before the measured elapsed time reaches a predetermined time (for example, "100 ms"), that is, when the in-vehicle apparatus 100 sends the disconnection response of HFP to the mobile-phone 200 at step S109 before the measured elapsed time reaches a predetermined time (for example, "100 ms"), the controller 101 re-connects HFP with the mobile-phone 200. The controller 101, which perform the elapsed time measurement and steps S107 and S109, may correspond to a communication disconnection detection means (or a communication disconnection detection device).

When the disconnection of HFP regardless of user's intention is detected in the above way, the in-vehicle apparatus 100 sends a connection request of HFP to the mobile-phone 200, at step S110. Upon receipt of the connection request of HFP, the mobile-phone 200 accepts the connection request of HFP, and sends a connection response (Accepted) of HFP to the in-vehicle apparatus 100 at step S111. Upon receipt of the connection response of HFP, the in-vehicle apparatus 100 connects HFP with the mobile-phone 200 and becomes a HFP-connected state at step S112. The controller 101, which performs steps S110 to S112, may correspond to a communication re-connection means (or a communication re-connection device).

As described above, when the mobile-phone 200 re-connects HFP with the in-vehicle apparatus 100, the mobile-phone 200 seeks to further connect A2DP. Therefore, the mobile-phone 200 sends a service inquiry, which is an inquiry to check whether or not the service of A2DP is supported, to the in-vehicle apparatus 100 at step S113. Since the in-vehicle apparatus 100 supports the service of A2DP, upon receipt of the service inquiry from the mobile-phone 200, the in-vehicle apparatus 100 sends a service inquiry response indicating that the service of A2DP is available to the mobile-phone 200 at step S114. Then, upon receipt of the service inquiry response indicative of the availability of the service of A2DP from the in-vehicle apparatus 100, the mobile-phone 200 sends a connection request of A2DP to the in-vehicle apparatus 100 at step S115.

At this moment, if the in-vehicle apparatus 100 does not accept the connection request of A2DP because of the above-described configuration, the mobile-phone 200 will disconnect again the re-connected HFP regardless of user's intention. In such a case, the disconnection of the HFP regardless of user's intention and the re-connection of the disconnected HFP will be repeated.

In view of this, in the present embodiment, when the in-vehicle apparatus 100 (specifically, the controller 101) re-connects the HFP with the mobile-phone 200 and thereafter the mobile-phone 200 again sends the connection request of A2DP, the in-vehicle apparatus 100 accepts the connection request of A2DP in order to address the above-describe "problematic operation" of the mobile-phone 200.

Specifically, upon receipt of the connection request of A2DP from the mobile-phone 200, the in-vehicle apparatus 100 accepts the connection request of A2DP, and sends a connection response (Accepted) of A2DP to the mobile-phone 200 at step S116. Then, the in-vehicle apparatus 100 becomes a state of having the HFP connection and A2DP connection with the mobile-phone 200 at step S117. The controller 101, which performs step S116, may correspond to a communication re-connection means (or a communication re-connection device).

In the first embodiment, the in-vehicle apparatus 100 starts measuring the elapsed time from the reference time point, which is a time point when the in-vehicle apparatus 100 sends the rejection response of A2DP to the mobile-phone 200 (S107). When the disconnection response of HFP is sent to the mobile-phone 200 before the elapsed time reaches the predetermined time (S109), the in-vehicle apparatus 100 determines to re-connect HFP with the mobile-phone 200 (S110-S112). Accordingly, the disconnection of the HFP regardless of user's intention can be detected with use of a simple configuration such a time counter or the like. Additionally, when the disconnection of the HFP regardless of user's intention occurs, the maintaining of the disconnected state can be avoided.

In the first embodiment, the in-vehicle apparatus 100 is configured to connect only a requesting profile, which is a profile that the in-vehicle apparatus 100 requests another short-range wireless communication apparatus to connect, and further configured not to accept a connection request of a requested profile, which is a profile that the in-vehicle apparatus 100 is requested to connect by another short-range wireless communication apparatus. However, to the mobile-phone 200 which may perform the above-described "problematic operation, the in-vehicle apparatus 100 gives the following exception. Specifically, provided that the in-vehicle apparatus 100 re-connects the HFP with the mobile-phone 200 and thereafter the connection request of A2DP is again sent from the mobile-phone 200, the in-vehicle apparatus 100 determines to accept the connection request (S116). Accordingly, a situation where the mobile-phone 200 again disconnects the re-connected HFP does not take place. Therefore, disconnecting of the HFP regardless of user's intention and re-connecting of the disconnected HFP can be prevented.

Second Embodiment

Figure 3:
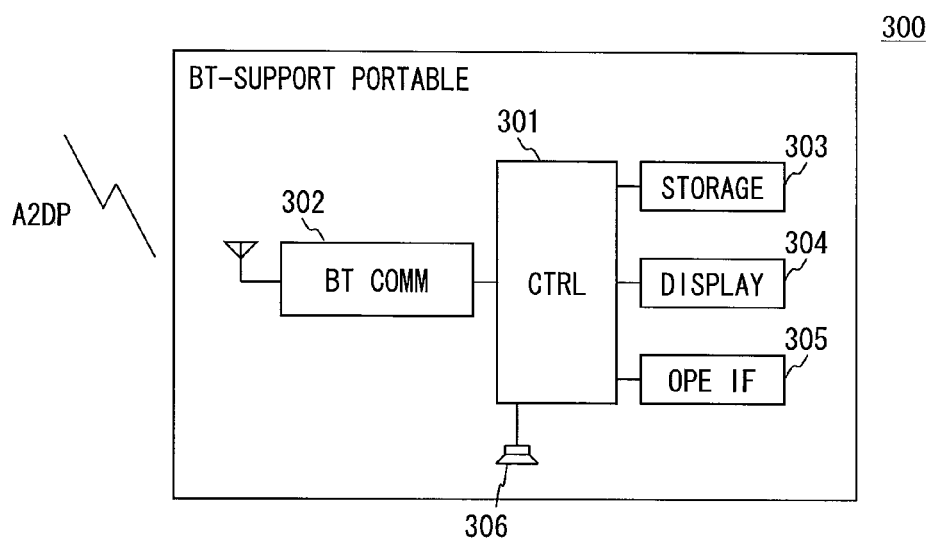
FIG. 3 is a block diagram illustrating a portable apparatus as a short-range wireless communication apparatus according to a second embodiment.

A short-range wireless communication apparatus according to a second embodiment will be described with reference to FIGS. 3 and 4.

In the present embodiment, the short-range wireless communication apparatus is embodied as an in-vehicle apparatus 100 supporting a Bluetooth® (abbreviated to BT hereinafter) and having a BT communication function, as is the case with the first embodiment. It is assumed that a BT-supporting mobile-phone 200 with a BT communication function and A BT-supporting portable apparatus 300 with a BT communication function are carried in a compartment of a vehicle (not shown) equipped with the in-vehicle apparatus 100, and that the in-vehicle apparatus 100, the mobile-phone 200, and the portable apparatus 300 are communicable with each other.

In the present embodiment, the in-vehicle apparatus 100 can connect a requesting profile, which is a profile that the in-vehicle apparatus 100 requests another short-range wireless communication apparatus to connect. Additionally, the in-vehicle apparatus 100 is configured to accept a connection request of a profile from another short-range wireless communication apparatus expect for the case of a shortage of resource.

A difference from the first embodiment will be mainly described. As illustrated in FIG. 3, the portable apparatus 300 includes a controller 301, a BT communication unit 302, a storage unit 303, a display unit 304, an operation unit 305, and a speaker 306.

The controller 301 may be a known computer with a CPU, a RAM, a ROM, an I/O bus and others, and controls generally all of operations of the portable apparatus 300.

The BT communication unit 302 is connected to the controller 301, and performs BT communication with the in-vehicle apparatus 100 under the control of the controller 301. The BT communication unit 302 can connect multiple profiles specified by the BT telecommunication standard, including A2DP and the like.

The storage unit 303 can store various kinds of data, such as streaming data and the like. The storage unit 303 is connected to the controller 301, which can suitably read out various kinds of data from the storage unit 303 and write various kinds of data in the storage unit 303.

The display unit 304 is connected to the controller 301. When a display command signal is inputted from the controller 301, the display unit 304 displays various images based on the inputted display command signal.

The operation unit 305 is connected to the controller 301, and is provided with, for example, a user operable push button. When the user operates the push button, the operation unit 305 outputs a signal corresponding to the operated push button to the controller 301.

The speaker 306 may include a known speaker and is connected to the controller 301.

When A2DP is connected between the BT communication unit 302 and the in-vehicle apparatus 100, the controller 301 sends the streaming data stored in the storage unit 303 to the in-vehicle apparatus 100. When A2DP is not connected between the BT communication unit 302 and the in-vehicle apparatus 100, the controller 301 reproduces the streaming data stored in the storage unit 303, and outputs it from the speaker 306.

It is assumed that the mobile-phone 200 performs the "problematic operation" as is the case with the first embodiment. In the present embodiment, the in-vehicle apparatus 100 can connect a requesting profile, a connection request of which is sent from the in-vehicle apparatus 100 to another short-range wireless communication apparatus; additionally, the in-vehicle apparatus 100 configured to accept a connection request of a profile from the another short-range wireless communication apparatus as long as the in-vehicle apparatus 100 does not have a shortage of resource. Specifically, upon receipt of a connection request of a profile from the mobile-phone 200 or the portable apparatus 300, the in-vehicle apparatus 100 checks the residue of resource of the in-vehicle apparatus 100. When the resource is insufficient, that is, when there is no resource available for connecting the requested profile, the in-vehicle apparatus 100 sends a rejection response (Not accepted) of the profile to the mobile-phone 200 or the portable apparatus 300.

When the in-vehicle apparatus 100 of the present embodiment seeks to connect HFP with the mobile-phone 200 involving the problematic operation, the following situations may occur. The explanation will be given with reference to FIG. 4.

Figure 4:
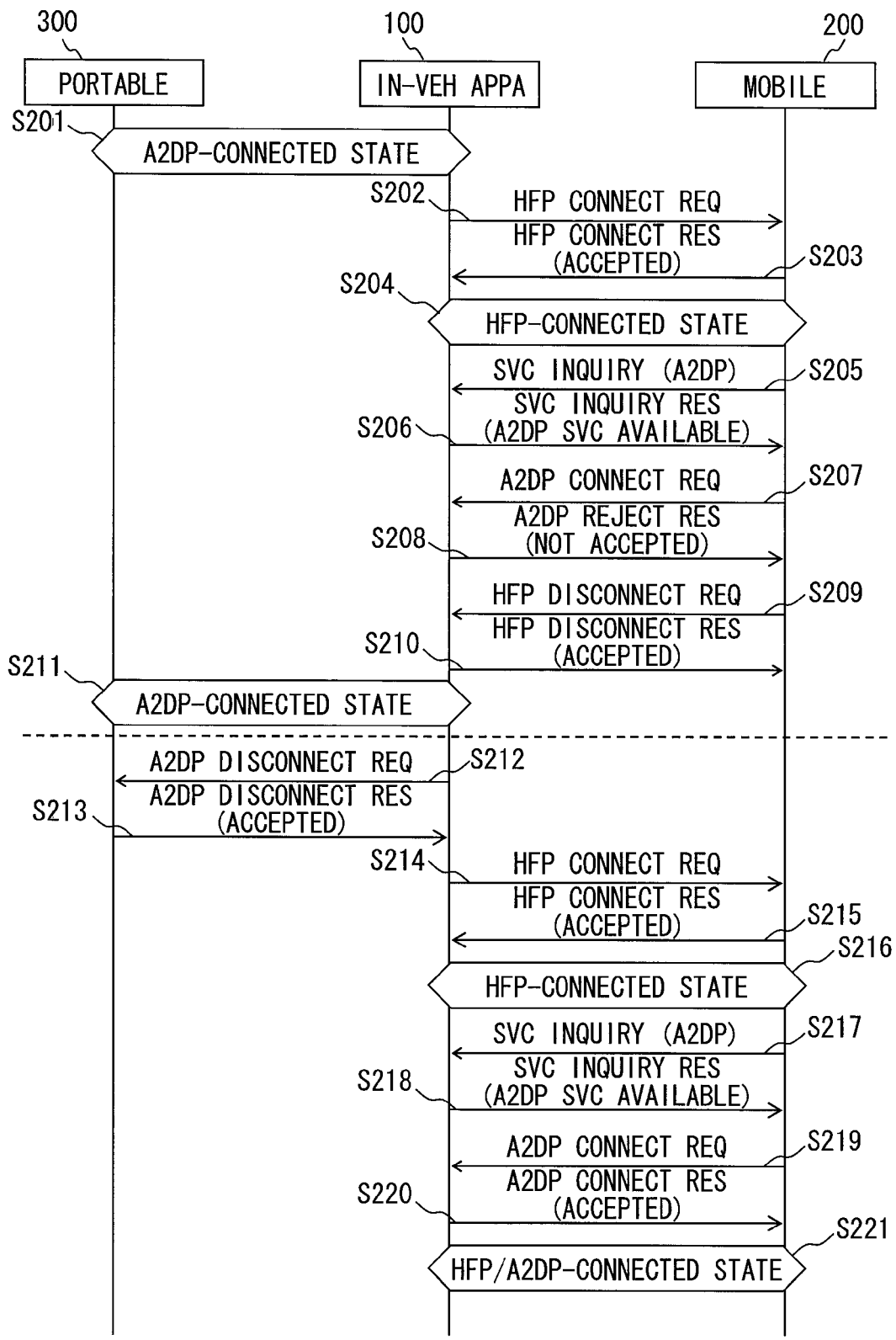
FIG. 4 is a sequence diagram illustrating an example of operations of the in-vehicle apparatus and the mobile-phone according to the second embodiment.

As illustrated in FIG. 4, it is assumed that the in-vehicle apparatus 100 is already having the A2DP connection with the portable apparatus 300 (at step S201), and that the in-vehicle apparatus 100 sends a connection request of HFP to the mobile-phone 200 (at step S202).

At this time, upon receipt of the connection request of HFP, the mobile-phone 200 accepts the connection request of HFP, and sends a connection response (Accepted) of HFP to the in-vehicle apparatus 100 at step S203. Upon receipt of the connection response of HFP, the in-vehicle apparatus 100 becomes a state of having the HFP-connection with the mobile-phone 200 at step S204.

At this moment, upon connecting HFP with the in-vehicle apparatus 100, the mobile-phone 200 seeks to further connect A2DP. Therefore, the mobile-phone 200 sends a service inquiry to check whether or not the service of A2DP is supported to the in-vehicle apparatus 100 at step S205. Since the in-vehicle apparatus 100 supports the service of A2DP, the in-vehicle apparatus 100 receiving the service inquiry from the mobile-phone 200 sends a service inquiry response indicative of the availability of the service of A2DP to the mobile-phone 200 at step S206. Then, upon receipt of the service inquiry response indicating that the service of A2DP is available from the in-vehicle apparatus 100, the mobile-phone 200 sends a connection request of A2DP to the in-vehicle apparatus 100 at step S207.

In this case, since the in-vehicle apparatus 100 has already connected A2DP with the portable apparatus 300 and does not have a resource available for new connection of A2DP, the in-vehicle apparatus 100 rejects accepting the connection request of A2DP from the mobile-phone 200, and sends a rejection response (Not accepted) of A2DP to the mobile-phone 200 at step S208. Then, the mobile-phone 200 receives the rejection response of A2DP from the in-vehicle apparatus 100 (that is, the connection request of A2DP was not accepted), and thus, the mobile-phone 200 sends a disconnection request of HFP to the in-vehicle apparatus 100 at step S209 (the problematic operation).

As a result, the in-vehicle apparatus 100 sends a disconnection response (Accepted) of HFP to the mobile-phone 200 at step S210. The mobile-phone 200 disconnects the already-connected HFP regardless of user's intention, and a HFP-disconnected state is maintained. Additionally, an A2DP-connected state between the in-vehicle apparatus 100 and the portable apparatus 300 is maintained (at step S211). It should be noted that in the related art, step S211 and steps before S211, which are above the dashed line in FIG. 4, are performed.

In view of this, in the present embodiment, when HFP is connected between the in-vehicle apparatus and the mobile-phone 200, the in-vehicle apparatus 100 (specifically, the controller 101) detects whether or not the in-vehicle apparatus 100 rejects accepting the connection request of A2DP from the mobile-phone 200 and the HFP is consequently disconnected regardless of user's intention. When detecting the disconnection, the in-vehicle apparatus 100 re-connects the HFP with the mobile-phone 200 after securing the resource for connecting A2DP.

More specifically, at step S208, the controller 101 starts measuring an elapsed time from a reference time point, which is a time point when the in-vehicle apparatus 100 rejects accepting the connection request of A2DP from the mobile-phone 200, that is, a time point when the in-vehicle apparatus 100 sends the rejection response (Not accepted) of A2DP to the mobile-phone 200. When the connection of HFP with the mobile-phone 200 is disconnected before the measured elapsed time reaches a predetermined time (for example, "100 ms"), that is, when the in-vehicle apparatus 100 sends the disconnection response of HFP to the mobile-phone 200 at step S210 before the measured elapsed time reaches a predetermined time (for example, "100 ms"), the controller 101 secures the resource for connecting A2DP with the mobile-phone 200 by disconnecting A2DP with the portable apparatus 300, and thereafter re-connects HFP with the mobile-phone 200.

Specifically, the controller 101 sends a disconnection request of A2DP to the portable apparatus 300 at step S212. As a result, upon receipt of the disconnection request of A2DP, the portable apparatus 300 accepts the disconnection request of A2DP, and sends a disconnection response (Accepted) of A2DP to the in-vehicle apparatus 100 at step S213. Accordingly, the connection of A2DP between the in-vehicle apparatus 100 and the portable apparatus 300 is disconnected, and the resource of the in-vehicle apparatus 100 is secured. The controller 101, which performs processing at step S212, may correspond to a communication re-connection means (or a communication re-connection device).

When the in-vehicle apparatus 100 secures the resource in the above way, the in-vehicle apparatus 100 sends a connection request of HFP to the mobile-phone 200 at step S214. Upon receipt of the connection request of HFP, the mobile-phone 200 accepts the connection request of HFP, and sends a connection response (Accepted) of HFP to the in-vehicle apparatus 100 at step S215. Upon receipt of the connection response of HFP, the in-vehicle apparatus 100 becomes a state of having the HFP connection with the mobile-phone 200 at step S216. The controller 101, which performs processing steps S214 to S216 may correspond to a communication re-connection means (or a communication re-connection device).

As described the above, upon re-connecting HFP with the in-vehicle apparatus 100, the mobile-phone 200 seeks to further connect A2DP. Therefore, the mobile-phone 200 sends a service inquiry to the in-vehicle apparatus 100 at step S217 to check whether or not the service of A2DP is supported. Since the in-vehicle apparatus 100 supports the service of A2DP, upon receiving the service inquiry from the mobile-phone 200, the in-vehicle apparatus 100 sends a service inquiry response indicating that the service of A2DP is available to the mobile-phone 200 at step S218. Then, upon receipt of the service inquiry response indicative of the availability of the service of A2DP from the in-vehicle apparatus 100, the mobile-phone 200 sends a connection request of A2DP to the in-vehicle apparatus 100 at step S219.

Because the resource for connecting A2DP with the mobile-phone 200 has been secured, the in-vehicle apparatus 100 accepts the connection request of A2DP upon receipt of the connection request of A2DP from the mobile-phone 200, and sends a connection response (Accepted) of A2DP to the mobile-phone 200 at step S220. Then, the in-vehicle apparatus 100 becomes a state of having the HFP connection and the A2DP connection with the mobile-phone 200 at step S221.

The in-vehicle apparatus 100 of the present embodiment gives priority to connecting HFP over connecting A2DP with the mobile-phone 200 or the portable apparatus 300.

In the second embodiment, as is the case with the first embodiment, the in-vehicle apparatus 100 starts measuring a time elapsed from a reference time point, which is a time point of sending the rejection response of A2DP to the mobile-phone 200 (S208). When the disconnection response of HFP is sent to the mobile-phone 200 before the measured elapsed time reaches the predetermined time (S210), the in-vehicle apparatus 100 re-connects HFP with the mobile-phone 200 (S214-S216). Accordingly, the disconnection of the connected HFP regardless of user's intention can be detected with use of a simple configuration such as a time counter or the like. Additionally, even if the connected HFP is disconnected regardless of user's intention, the maintaining of the disconnected can be prevented.

In the second embodiment, when having a shortage of resource, the in-vehicle apparatus 100 does not accept a connection request of a profile requested from another short-range wireless communication apparatus. After securing the resource for connecting A2DP, the in-vehicle apparatus 100 re-connects HFP with the mobile-phone 200. It should be noted that if the in-vehicle apparatus 100 reconnects HFP without securing the resource for connecting A2DP with the mobile-phone 200, the disconnection of the HFP regardless of user's intention and the re-connection of the disconnected HFP would be repeated. However, in the second embodiment, the in-vehicle apparatus 100 reconnects HFP with the mobile-phone 200 after securing a resource for connecting A2DP; accordingly, the disconnecting of the re-connected HFP by the mobile-phone 200 does not take place. Therefore, the disconnection of the connected HFP regardless of user's intention and the re-connection of the disconnected HFP can be prevented.

Third Embodiment

Figure 5:
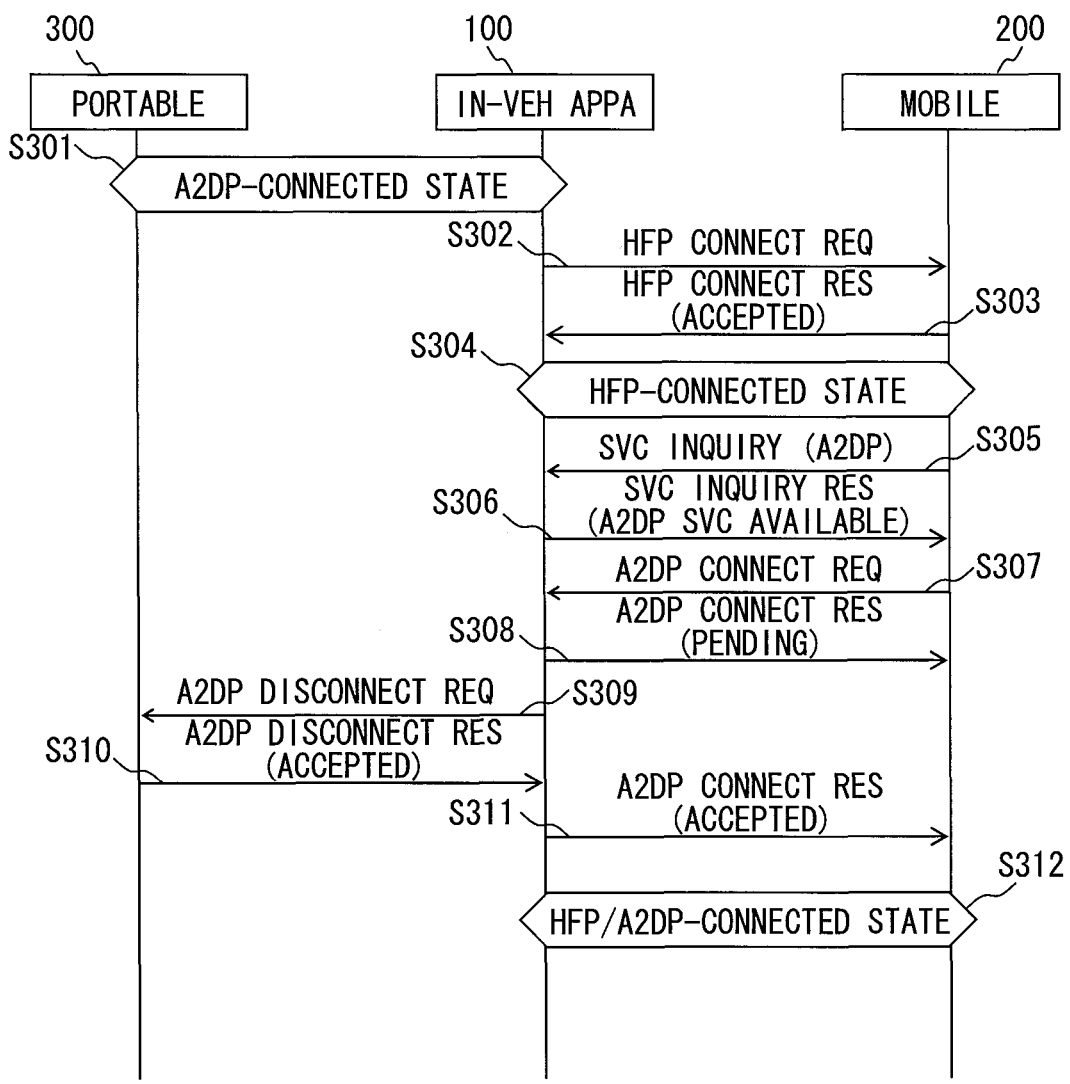
FIG. 5 is a sequence diagram illustrating an example of operations of an in-vehicle apparatus and a mobile-phone according to a third embodiment.

Next, a short-range wireless communication apparatus according to a third embodiment will be described with reference to FIG. 5.

In the present embodiment, the short-range wireless communication apparatus is embodied as an in-vehicle apparatus 100 supporting a Bluetooth® (abbreviated to BT hereinafter) and having a BT communication function, as is the case with the first embodiment and the second embodiment. It is assumed that a BT-supporting mobile-phone 200 with a BT communication function and a BT-supporting portable apparatus 300 with a BT communication function are carried in a compartment of a vehicle (not shown) equipped with the in-vehicle apparatus 100, and that the in-vehicle apparatus 100, the mobile-phone 200, and the portable apparatus 300 are communicable with each other by BT communication.

Additionally, in the present embodiment, the mobile-phone 200 is assumed to perform the "problematic operation" as is the case with the first embodiment.

In the present embodiment, as is the case with the second embodiment, the in-vehicle apparatus 100 is configured to connect a requesting profile, which is a profile that the in-vehicle apparatus 100 requests to another short-range wireless communication apparatus. Additionally, the in-vehicle apparatus 100 is configured not to reject accepting a connection request of a profile from another short-range wireless communication apparatus. In this regard, unlike in the second embodiment, when having the shortage of resource, the in-vehicle apparatus 100 suspends accepting a connection request of a profile from another short-range wireless communication apparatus; and the in-vehicle apparatus 100 secures the resource and thereafter accepts the connection request of the profile from the another short-range wireless communication apparatus. Specifically, upon receipt of a connection request of the profile from the mobile-phone 200 or the portable apparatus 300, the in-vehicle apparatus 100 checks the residue of resource thereof. When the resource is insufficient, that is, when there is no resource available for connecting the requested profile, the in-vehicle apparatus 100 suspends accepting the profile and sends a suspending response (Pending) to the mobile-phone 200 or the portable apparatus 300.

This will be more specifically explained with reference to FIG. 5. As illustrated in FIG. 5, it is assumed that the in-vehicle apparatus 100 is already in the state of having the A2DP-connection with the portable apparatus 300 (step S301), and that the in-vehicle apparatus 100 sends a connection request of HFP to the mobile-phone 200 in this state (step S302).

Upon receipt of the connection request of HFP, the mobile-phone 200 accepts the connection request of HFP, and sends a connection response (Accepted) of HFP to the in-vehicle apparatus 100 at step S303. Upon receipt of the connection response of HFP, the in-vehicle apparatus 100 becomes a state of having the HFP connection with the mobile-phone 200 at step S304.

At this moment, the mobile-phone 200 having the HFP connection with the in-vehicle apparatus 100 seeks to further connect A2DP. Therefore, the mobile-phone 200 sends a service inquiry to the in-vehicle apparatus 100 to check whether or not the in-vehicle apparatus 100 supports the service of A2DP at step S305. Since the in-vehicle apparatus 100 supports the service of A2DP, upon receipt of the service inquiry from the mobile-phone 200, the in-vehicle apparatus 100 sends a service inquiry response indicating that the service of A2DP is available to the mobile-phone 200 at step S306. Then, upon receipt of the service inquiry response indicating that the service of A2DP is available from the in-vehicle apparatus 100, the mobile-phone 200 sends a connection request of A2DP to the in-vehicle apparatus 100 at step S307.

In the second embodiment illustrated in FIG. 4, since the in-vehicle apparatus 100 is already having the A2DP-connection with the portable apparatus 300 and there is no resource available for new connection of A2DP, the in-vehicle apparatus 100 rejects accepting the connection request of A2DP sent from the mobile-phone 200, and sends a rejection response (Not accepted) of A2DP to the mobile-phone 200 at step S208. Then, the mobile-phone 200 receives the rejection response of A2DP from the in-vehicle apparatus 100 (that is, the connection request of A2DP is not accepted), and thus, the mobile-phone 200 sends a disconnection request of HFP to the in-vehicle apparatus 100 at step S209 (the problematic operation).

As a result, the in-vehicle apparatus 100 sends a disconnection response (Accepted) of HFP to the mobile-phone 200, at step S210. The mobile-phone 200 disconnects the already-connected HFP regardless of user's intention. In this way, in the second embodiment, the connection of HFP between the in-vehicle apparatus 100 and the mobile-phone 200 can be disconnected for a short time period.

In view of this, in the present embodiment, when having connected HFP with the mobile-phone 200, the in-vehicle apparatus 100 (specifically, the controller 101) suspends accepting a connection request of A2DP sent from the mobile-phone 200. During the suspending, the in-vehicle apparatus 100 secures a resource for connecting A2DP with the mobile-phone 200 by disconnecting the already-connected A2DP with the portable apparatus 300, and then accepts the connection request of A2DP from the mobile-phone 200. The A2DP connected with the portable apparatus 300 may correspond to a connected profile except a predetermined profile.

As described above, upon receipt of a connection request of A2DP sent from the mobile-phone 200, the controller 101 checks the residue of resource of the in-vehicle apparatus 100. When the resource is insufficient, that is, when there is no resource available for connecting the requested profile, the controller 101 suspends accepting the connection request of A2DP and sends, to the mobile-phone 200, a suspending response (Pending) indicating that accepting is suspended at step S308. Upon receipt of the suspending response (Pending) of A2DP, the mobile-phone 200 temporarily stops a process relating to connecting A2DP without disconnecting the HFP connection with the in-vehicle apparatus 100, because the mobile-phone 200 has not received a rejection response (Not Accepted) of A2DP. The controller 101, which performs step S308, may correspond to a connection request suspension means (or a connection request suspension device).

While suspending accepting the connection request of A2DP in the above way, the controller 101 sends a disconnection request of A2DP to the portable apparatus 300 at step S309, The portable apparatus 300 accepts the disconnection request of A2DP, and sends a disconnection response (Accepted) of A2DP to the in-vehicle apparatus 100 at step S310. As a result, the connection of A2DP between the in-vehicle apparatus 100 and the portable apparatus 300 is disconnected, and the resource of the in-vehicle apparatus 100 is secured.

When the in-vehicle apparatus 100 secures the resource, the in-vehicle apparatus 100 accepts the connection request of A2DP suspended at step S307, and sends a connection response (Accepted) of A2DP to the mobile-phone 200 at step S311. Then, the in-vehicle apparatus 100 becomes a state of having the HFP and A2DP connection with the mobile-phone 200 at step S312. The controller 101, which performs steps S309 to S311, may correspond to a connection request acceptance means (or a connection request acceptance device).

The in-vehicle apparatus 100 of the present embodiment also gives priority to connecting HFP over connecting A2DP with the mobile-phone 200 or the portable apparatus 300.

In the third embodiment as explained above, when the in-vehicle apparatus 100 receives a connection request of A2DP from the mobile-phone 200 in a state where the HFP is connected between the in-vehicle apparatus 100 and the mobile-phone 200, the in-vehicle apparatus 100 temporarily suspends accepting the connection request of A2DP. During the suspending, the in-vehicle apparatus 100 disconnects the already-connected A2DP with the portable apparatus 300 and thereby secures the resource for connecting A2DP with the mobile-phone 200, and then accepts the connection request of A2DP sent from the mobile-phone 200. Since the mobile-phone 200 does not receive a rejection response of A2Dp from the in-vehicle apparatus 100, the mobile-phone 200 only stops the process relating to connecting A2DP without disconnecting the HFP connection with the in-vehicle apparatus 100. Therefore, according to the above-described configuration, the disconnection of the HFP connection regardless of user's intension does not occur; therefore, the maintaining of the HFP disconnected state can be avoided.

(Aspects)

According to a first aspect of the present disclosure, a subject short-range wireless communication apparatus, which is capable of simultaneously connecting a plurality of predetermined profiles with another short-range wireless communication apparatus acting as a connection counterpart, includes a communication disconnection detection device and a communication re-connection device. In cases where a first predetermined profile is connected between the subject short-range wireless communication apparatus and the another short-range wireless communication apparatus, the communication disconnection detection device detects whether or not the first predetermined profile is disconnected due to the subject short-range wireless communication apparatus' non-acceptance of a connection request of the second predetermined profile sent from the another short-range wireless communication apparatus. When the communication disconnection detection device detects that the first predetermined profile is disconnected, the communication re-connection device re-connects the first predetermined profile with the another short-range wireless communication apparatus when the communication disconnection detection device detects that the first predetermined profile is disconnected.

According to the above-described configuration of the subject short-range wireless communication apparatus, when the first predetermined profile is connected between the subject short-range wireless communication apparatus and the another short-range wireless communication apparatus, the communication disconnection detection device detects whether or not the first predetermined profile is disconnected due to the subject short-range wireless communication apparatus' non-acceptance of the connection request of the second predetermined profile sent from the another short-range wireless communication apparatus (that is, the communication disconnection detection device detects whether or not the first predetermined profile is disconnected regardless of user's intention). Thereafter, the communication re-connection device re-connects the first predetermined profile, based on the detection of the disconnection of the first predetermined profile by the communication disconnection detection device. Accordingly, even if the connected profile is disconnected regardless of user's intention, it is possible to prevent the disconnected state from being maintained.

The above short-range wireless communication apparatus may be configured as follows. The communication disconnection detection device starts measuring an time elapsed from a reference time point, which is a time point when the subject short-range wireless communication apparatus rejects accepting the connection request of the second predetermined profile sent from the another short-range wireless communication apparatus in a state where the first predetermined profile is connected between the subject short-range wireless communication apparatus and the another short-range wireless communication apparatus. If the first predetermined profile is disconnected before the measured elapsed time reaches a predetermined time, the communication disconnection detection device determines that the first predetermined profile is disconnected. According to this configuration, the disconnection of a profile regardless of user's intention can be detected with use of a simple configuration such as a time counter or the like.

In some cases, it is conceivable that the subject short-range wireless communication apparatus is designed to connect a requesting profile and reject accepting a connection request of a requested profile, where the requesting profile is a profile that the subject short-range wireless communication apparatus requests another short-range wireless communication apparatus to connect, and the requested profile is a profile that the subject short-range wireless communication apparatus is requested to connect by the another short-range wireless communication apparatus. In this case, the following situation may occur. When the communication re-connection device re-connects the first predetermined profile with another short-range wireless communication apparatus, the connection request of the second predetermined profile is again sent from the another short-range wireless communication apparatus. If the subject short-range wireless communication apparatus does not accept the connection request because of its design, the another short-range wireless communication apparatus disconnects again the re-connected first predetermined profile; as a result, the disconnection of the profile regardless of user's intention and the re-connection of the disconnected profile are repeated.

In view of the above, for the case of the above-described design, the subject short-range wireless communication apparatus may be configured as follows. When the communication re-connection device reconnects the first predetermined profile and thereafter the another short-range wireless communication apparatus again sends the connection request of the second predetermined profile, the communication re-connection device accepts the connection request of the second predetermined profile. According to this configuration, the situation where the another short-range wireless communication apparatus again disconnects the re-connected first predetermined profile does not occur. Therefore, the repeatedly disconnecting of the connected profile regardless of user's intention and re-connecting of the disconnected profile can be prevented.

It is conceivable that in a case of a shortage of resource, the subject short-range wireless communication apparatus may not accept a connection request of a profile sent from another short-range wireless communication apparatus, and that the following situations may arise.

When the communication re-connection device re-connects the first predetermined profile with the another short-range wireless communication apparatus, the connection request of the second predetermined profile is again sent from the another short-range wireless communication apparatus. If the subject short-range wireless communication apparatus has already connected the second predetermined profile with yet-another short-range wireless communication apparatus, the subject short-range wireless communication apparatus cannot accept the connection request of the second predetermined profile from the another short-range wireless communication apparatus due to the insufficient resource. In this way, if the subject short-range wireless communication apparatus does not accept the connection request from the another short-range wireless communication apparatus due to the insufficient resource, the another short-range wireless communication apparatus will disconnect again the re-connected predetermined profile; and as a result, the disconnecting of the connected profile regardless of user's intention and the re-connecting of the disconnected profile will be repeated. In view of this, the subject short-range wireless communication apparatus may be configured as follows. While having a shortage of resource, the subject short-range wireless communication apparatus rejects accepting the connection request of a requested profile, which is a profile that the subject short-range wireless communication apparatus is requested to connect by the another short-range wireless communication apparatus. When the communication disconnection detection device determines that the first predetermined profile is disconnected, the communication re-connection device secures the resource to re-connect the second predetermined profile. According to this configuration, the situation where the by another short-range wireless communication apparatus disconnects the re-connected first predetermined profile does not take place. Therefore, the disconnecting of the connected profile regardless of user's intention and the re-connecting of the disconnected profile can be prevented.

According to a second aspect of the prevent disclosure, a subject short-range wireless communication apparatus, which is capable of simultaneously connecting a plurality of predetermined profiles including a first predetermined profile and a second predetermined profile with another short-range wireless communication apparatus acting as a connection counterpart, includes a connection request suspension device and a connection request acceptance device. The connection request suspension device suspends accepting the connection request of the second predetermined profile sent from the another short-range wireless communication apparatus. When the subject short-range wireless communication apparatus rejects accepting the connection request of the second predetermined profile, the another short-range wireless communication apparatus disconnects the first predetermined profile connected between the subject short-range wireless communication apparatus and the another short-range wireless communication apparatus. While the connection request suspension device 101 is suspending accepting the connection request of the second predetermined profile, the connection request acceptance device secures a resource required to connect the second predetermined profile. After securing the resource required to connect the second predetermined profile, the connection request acceptance device accepts the connection request of the second predetermined profile.

According to the above-described configuration of the subject short-range wireless communication apparatus, upon receipt of the connection request of the second predetermined profile from the another short-range wireless communication apparatus, the subject short-range wireless communication apparatus does not reject the connection request of the second predetermined profile but temporarily suspends accepting the connection request of the second predetermined profile. Therefore, during the suspension, the another short-range wireless communication apparatus does not disconnect the first predetermined profile connected with the subject short-range wireless communication apparatus. Then, while the subject short-range wireless communication apparatus is suspending accepting the connection request of the second predetermined profile, in other words, while the first predetermined profile is connected, the subject short-range wireless communication apparatus secures the resource required to connect the second predetermined profile and accepts the connection request of the second predetermined profile after securing the resource. Therefore, it is possible to connect the second predetermined profile without disconnecting the first predetermined profile. In this way, it becomes possible to prevent the connected profile from being disconnected regardless user's intention. According to the above-described configuration, the disconnection of the connected profile regardless of user's intention does not occur, and the maintaining of the disconnected state can be avoided.

In the above-described configuration, it may be preferable that the connection request suspension device send a suspension response indicating that acceptance of the connection request of the second predetermined profile is suspended to the another short-range wireless communication apparatus.

In the above-described configuration, the connection request acceptance device may secure the required resource by disconnecting a connected-profile except the first predetermined profile.

Embodiments, configurations, aspects etc. according to the present invention are not limited to respective above-described embodiments, configurations, aspects etc. Embodiments, configurations, aspects etc. obtained by combining technical parts disclosed in different embodiments, configurations, aspects etc. are also included in a technical scope of the embodiments, the configurations, the aspects etc. according to the present invention.

The invention claimed is:
1. A subject short-range wireless communication apparatus capable of simultaneously connecting a plurality of predetermined profiles with another short-range wireless communication apparatus acting as a connection counterpart, the subject short-range wireless communication apparatus comprising:
   a communication disconnection detection device that, in cases where a first predetermined profile is connected between the subject short-range wireless communication apparatus and the another short-range wireless communication apparatus, detects whether or not the first predetermined profile is disconnected due to the subject short-range wireless communication apparatus' non-acceptance of a connection request of a second predetermined profile sent from the another short-range wireless communication apparatus; and
   a communication re-connection device that, in response to disconnection of the first predetermined profile detected by the communication disconnection detection device, re-connects the first predetermined profile with the another short-range wireless communication apparatus.

2. The subject short-range wireless communication apparatus according to claim 1, wherein:
the communication disconnection detection device starts measuring an time elapsed from a reference time point, which is a time point when the subject short-range wireless communication apparatus rejects accepting the connection request of the second predetermined profile sent from the another short-range wireless communication apparatus in a state where the first predetermined profile is connected between the subject short-range wireless communication apparatus and the another short-range wireless communication apparatus; and
if the first predetermined profile is disconnected before the measured elapsed time reaches a predetermined time, the communication disconnection detection device determines that the first predetermined profile is disconnected.

3. The subject short-range wireless communication apparatus according to claim 1, wherein:
the subject short-range wireless communication apparatus is
configured to connect a requesting profile, which is a profile that the subject short-range wireless communication apparatus requests the another short-range wireless communication apparatus to connect, and
configured to reject accepting the connection request of a requested profile, which is a profile that the another short-range wireless communication apparatus requests the subject short-range wireless communication apparatus to connect; and
in cases where the communication re-connection device reconnects the first predetermined profile and thereafter the another short-range wireless communication apparatus again sends the connection request of the second predetermined profile, the communication re-connection device accepts the connection request of the second predetermined profile.

4. The subject short-range wireless communication apparatus according to claim 1, wherein:
while having a shortage of resource, the subject short-range wireless communication apparatus rejects accepting the connection request of a requested profile, which is a profile that the another short-range wireless communication apparatus requests the subject short-range wireless communication apparatus to connect; and
when the communication disconnection detection device determines that the first predetermined profile is disconnected, the communication re-connection device secures the resource to re-connect the second predetermined profile.

5. A subject short-range wireless communication apparatus capable of simultaneously connecting a plurality of predetermined profiles including a first predetermined profile and a second predetermined profile with another short-range wireless communication apparatus acting as a connection counterpart, the subject short-range wireless communication apparatus comprising:
a connection request suspension device that suspends accepting the connection request of the second predetermined profile sent from the another short-range wireless communication apparatus, wherein when the subject short-range wireless communication apparatus rejects accepting the connection request of the second predetermined profile, the another short-range wireless communication apparatus disconnects the first predetermined profile connected between the subject short-range wireless communication apparatus and the another short-range wireless communication apparatus; and
a connection request acceptance device that secures a resource required to connect the second predetermined profile while the connection request suspension device is suspending accepting the connection request of the second predetermined profile, and that accepts the connection request of the second predetermined profile after securing the resource required to connect the second predetermined profile.

6. The subject short-range wireless communication apparatus according to claim 5, wherein
the connection request suspension device sends to the another short-range wireless communication apparatus a suspension response indicating that acceptance of the connection request of the second predetermined profile is suspended.

7. The subject short-range wireless communication apparatus according to claim 5, wherein
the connection request acceptance device secures the required resource by disconnecting a connected-profile except the first predetermined profile.

* * * * *